Ernst Tuchen
INVENTOR.

BY
Karl F. Ross
Attorney

United States Patent Office 3,522,502
Patented Aug. 4, 1970

3,522,502
CIRCUIT ARRANGEMENT FOR INTERMITTENT ENERGIZATION OF INDUCTION MOTOR
Ernst Tuchen, Jerxen-Orbke, near Detmold, Germany, assignor to Schleicher Regelautomatik GmbH & Co., KG., Bielefeld, Germany, a corporation of Germany
Filed Jan. 2, 1968, Ser. No. 695,084
Claims priority, application Germany, Jan. 19, 1967, 1,638,857
Int. Cl. H02p 1/40
U.S. Cl. 318—203                              10 Claims

ABSTRACT OF THE DISCLOSURE

An induction motor, e.g. of the squirrel-cage type, is intermittently energized from a source of single-phase alternating current through a thyraton-type valve circuit controlled by a clock network that includes a bistable circuit alternately set and reset by two associated timing circuits which may be independently adjusted to vary the "on" and "off" times of the motor. The valve circuit is split into two sections for reversible operation of the motor; one of the stator windings of the motor is energizable at the beginning of each "off" period under the control of a monostable multivibrator to exert a braking action.

---

Figure 1:
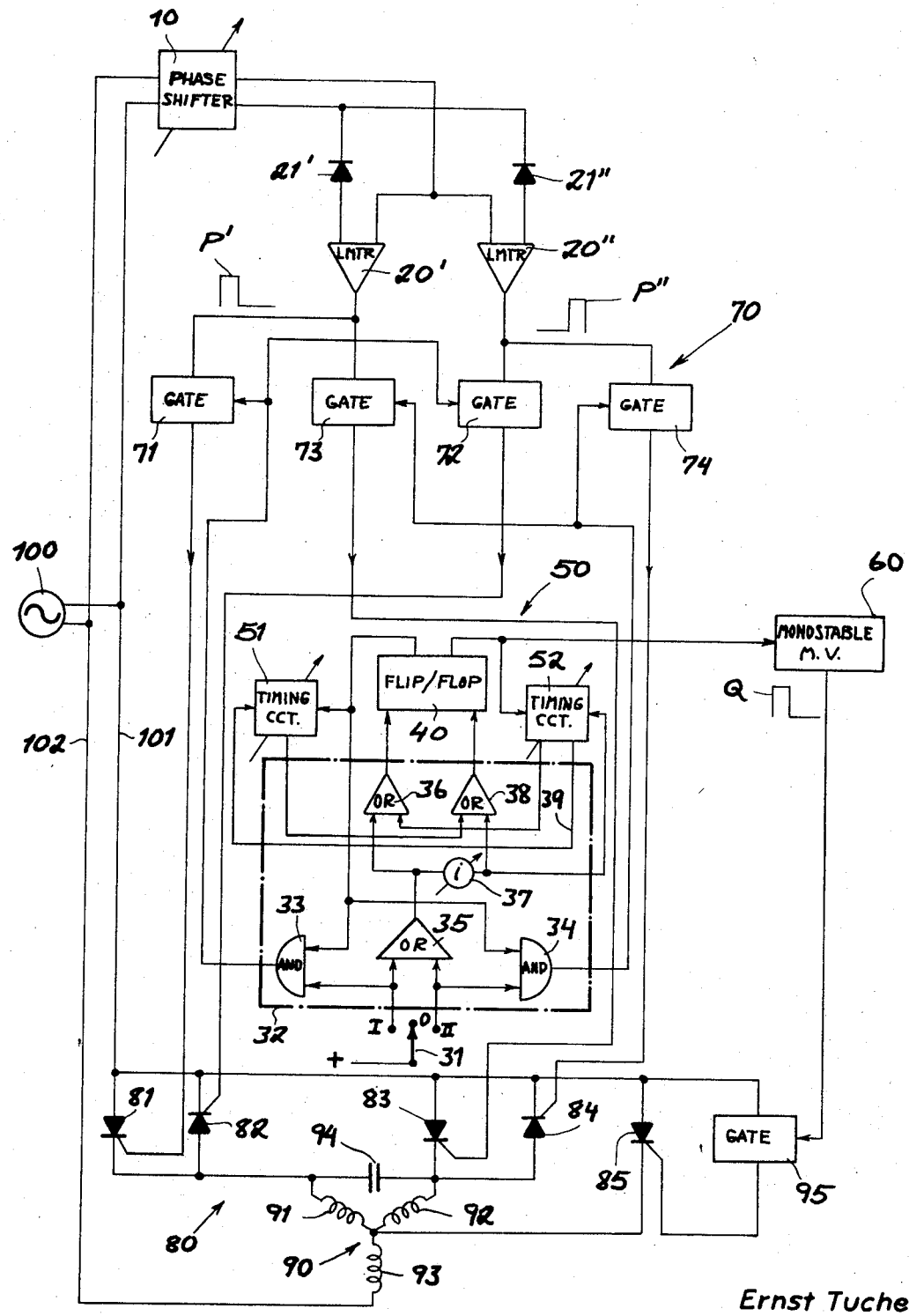

My present invention relates to a circuit arrangement for the control of an alternating-current motor, such as an induction motor of the squirrel-cage type, designed for the intermittent driving of a load in one or two directions. Such loads include, for example, machine-tool carriages, hydraulic valves, drill rigs, or, in the case of reciprocal motion, automatic washers and similar cleaning or treating equipment.

The general object of this invention is to provide a purely electronic circuit arrangement, free from moving contacts and other mechanical devices, for automatically maintaining a predetermined rhythm of alternating periods of operation and standstill, possibly with reversal of the direction of rotation at the beginning of each cycle of operation.

A more particular object of my invention is to provide means in such system for effectively and automatically braking the motor to standstill at the end of each operating cycle.

A further object of the present invention is to provide a system of this description in which the operating and standstill periods may be independently adjusted along with, preferably, the output torque and/or driving speed of the motor.

It is also a nobject of my present invention to provide a highly compact system of this character utilizing a minimum of electronic components.

In accordance with my invention, alternating current from a suitable power supply is delivered to an induction motor under the control of a circuit arrangement, referred to hereinafter as a clock network, which includes a bistable circuit or flip-flop in association with two alternately timing circuits, e.g., monostable multivibrators; when the flip-flop is set in its first operating state, e.g., by means of a manual start switch, it triggers the first timing circuit which thereupon measures an energizing interval during which a set of electronic control valves in the input of the motor are activated to permit rotation in a predetermined direction. At the end of that interval, the first timing circuit resets the flip-flop whereupon the second timing circuit goes into operation to measure a blocking interval whose length may be equal to or different from that of the aforestated energizing interval, the motor being deenergized at this time. At the end of the blocking interval, the flip-flop is again set in its first-mentioned state to repeat the cycle.

Advantageously, pursuant to another feature of my invention, a braking circuit is rendered effective at the beginning of the blocking cycle to arrest the motor armature or rotor. The braking circuit may be energized for only a fraction of a blocking interval, e.g., under the control of a monostable multivibrator triggered by the flip-flop directly or through one of its circuits.

In a preferred embodiment, in which the power supply is a source of single-phase current and the motor has a stator with three phase windings and a squirrel-cage rotor, the electronic valve circuit connects the power supply directly to a first stator winding and through a condenser or other phase-shifting reactance to a second stator winding whereby these two windings are energized in relatively rephased relationship, in series with the third winding, so as to give rise to an electromagnetic field rotating in a predetermined direction; with the valve circuit divided into two alternately activable sections, the direction of rotation can be reversed by interchanging the functions of the first and second windings. The switchover between the two valve-circuit sections may be performed anually, with the aid of a selector switch which may be identical with the starting switch or coupled therewith, or automatically, advantageously, by means of a further flip-flop alternately set and reset by one of the timing circuits at the beginning of successive cycles.

The electronic valves used in a system according to this invention are preferably thyratron-type three-electrode elements such as solid-state controlled rectifiers (SCR), sometimes referred to as "thyristors." The control electrodes or gates of these devices may be energized, in the activated condition of the corresponding circuit section, from the power supply through the intermediary of a phase-shifting network enabling adjustment of the firing angle and, thereby, of the average energization current supplied to the stator windings. In the presence of a load exerting a predetermined reaction torque, the speed of the motor during its "on" period will be substantially proportional to this average energizing current. The lengths of the "on" and "off" periods can be independently changed by suitable adjustment of the respective timing circuits.

Figure 2:
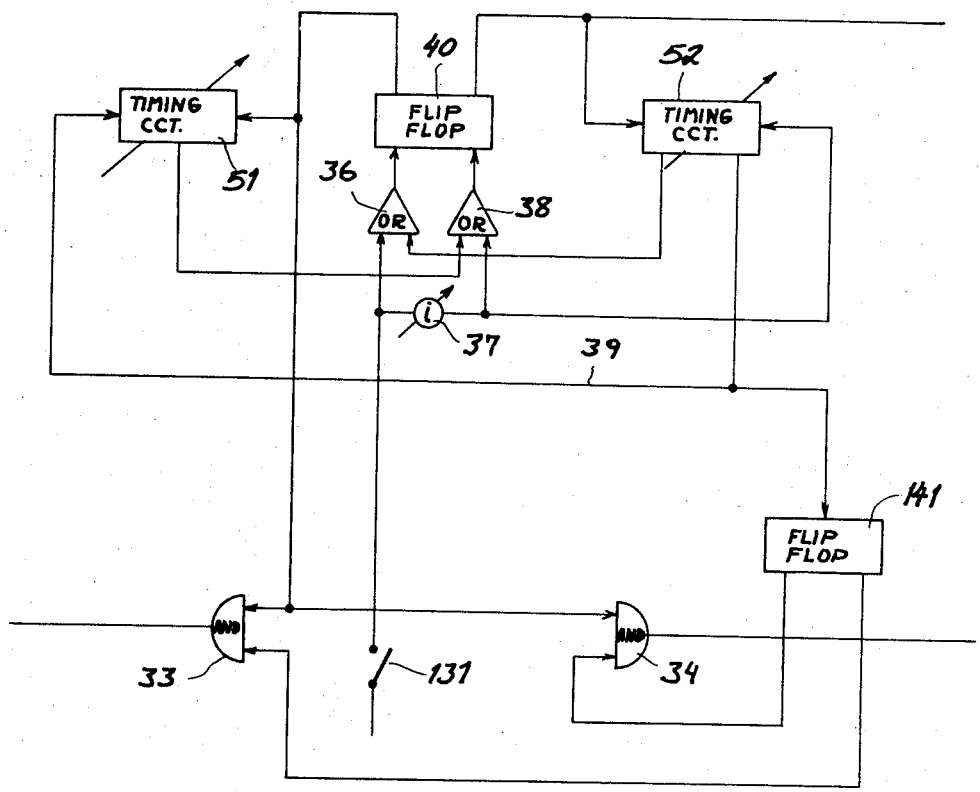

The invention will be described in greater detail with reference to the accompanying drawing in which:

FIG. 1 is a circuit diagram of a control system for an induction motor embodying my present improvement; and
FIG. 2 is a diagram illustrating a partial modification of the system of FIG. 1.

In FIG. 1 I have shown a source 100 of single-phase alternating current, having output leads 101 and 102, for the energization of a squirrel-cage motor, generally designated 90, whose conventional rotor has not been illustrated and whose stator comprises three phase windings 91, 92 and 93 connected in a Y-circuit. An electronic valve circuit 80 controls the energization of these phase windings and includes five SCR-type valves 81, 82, 83, 84 and 85. Controlled rectifiers 81 and 82 are inserted with mutually opposite polarity between source conductor 101 and the outer terminal of winding 91 which is coupled through a phase-shifting reactance 94, here shown as a condenser, to the corresponding terminal of winding 92; controlled rectifiers 83 and 84 are similarly inserted between the latter terminal and conductor 101. Controlled rectifier 85 is interposed between conductor 101 and the junction point of windings 91–93 while conductor 102 is directly connected to the outer terminal of winding 93.

The gate electrodes of rectifiers 81–84 are connected to respective output leads from a gating circuit 70 consisting of four gates 71, 72, 73 and 74. The inputs of gates 71 and 73 are connected in parallel to the output of an amplifier/limiter 20' which is energized, via a half-wave rectifier 21', from conductors 101 and 102 by way of an adjustable phase shifter 10 which may be a resistance/capacitance network; the inputs of gates 72 and 74 are similarly connected in parallel to the output of an amplifier/limiter 20" receiving current from source 100 through phase shifter 10 and a half-wave rectifier 21" whose polarity is opposite that of rectifier 21'. Limiters 20' and 20" thus conduct during alternate half-cycles of source 100 to produce positive pulses P' and P", respectively, which in the open state of the associated gates 71, 73 or 72, 74 are fed to the control electrodes of rectifiers 81, 83 or 82, 84 to trigger them into a state of conductivity. Depending on the adjustment of phase shifter 10, the controlled rectifiers will fire earlier or later within the positive half-cycle of the alternating voltage applied to their respective anodes. Thus, the phase-shifting network 10 determines in known manner the firing angle of these solid-state thyratrons or thyristors and, with it, the average current flow per cycle through the windings of motor 90.

In the operation of the system shown in FIG. 1, only one gate of each pair of parallel gates 71, 73 and 72, 74 is open at any time during energization of motor 90. The selective blocking and unblocking of these gates is controlled by a clock network 50 which comprises a bistable circuit of flip-flop 40 and two timing circuits 51, 52, e.g., monostable multivibrators, which are alternately tripped by respective outputs of flip-flop 40 and, in turn, reverse the operating condition of the flip-flop at the end of their respective timing intervals. Clock network 50 is under the control of an input circuit 32 which includes a pair of AND gates 33, 34 and an OR gate 35 having input connections to bank contacts of a three-position starting switch 31. The output or OR gate 35 is connected to the setting input of flip-flop 40 by way of an OR gate 36 whose other input is energizable from an output of timing circuit 52; OR gate 35 is also connected to the resetting input of flip-flop 40 through an inverter 37 and an OR gate 38 whose second input is tied to an output of timing circuit 51. Bank contacts I and II of switch 31 are connected to the two inputs of OR gate 35 and, in addition, to inputs of AND gates 33 and 34, respectively; these AND gates also receive input signals from an output of flip-flop 40 when the latter is in its "set" condition. On changing to its "reset" state, flip-flop 40 trips a monostable multivibrator 60 to produce an output pulse Q whose duration may be substantially greater than that of pulses P' and P" but is less than the operating periods of timing circuits 51 and 52. Pulse Q is applied to an input electrode of a further gate 95 which controls the energization of thyristor 85.

With start switch 31 in its neutral position O, inverter 37 has a finite or true output which, via OR gate 38, resets the flip-flop 40 when the latter happens to be in its set state and also applies a clamping voltage to timing circuit 52 which serves to continue its active condition beyond its normal operating period. When, thereafter, switch 31 is moved into position I, the leading edge of the voltage rise in the output of OR gate 35 sets the flip-flop 40 which in turn trips the timer 51 and applies an enabling voltage to one input of AND gate 33 whose other input is simultaneously energized from switch 31. The output of AND gate 33 now unblocks the gates 71 and 72 so that controlled rectifiers 81 and 82 are alternately fired in the rhythm of pulses P' and P". In the presence of a pulse P', positive current flow takes places from conductor 101 through thyristor 81 and winding 91, as well as over a parallel path which includes the condenser 94 in series with winding 92, to winding 93 and then to conductor 102. Since the first path is predominantly inductive whereas the second path is partly capacitive, the current through the series combination of windings 92 and 93 will lead the current through the series combination of windings 91 and 93. Thereafter, as pulse P' is replaced by a pulse P", the current flow is reversed and passes first from conductor 102 through windings 93, 92 in series with condenser 94 and, in parallel therewith but with a certain lag, through the series combination of windings 93, 91, thence via thyristor 82 back to conductor 101. Thus, the resultant of the individual magnetic fields generated in the stator of motor 90 is a vector rotating through 360° in the course of a cycle to rotate the squirrel-cage rotor in a counterclockwise sense as viewed in FIG. 1. This rotation continues as long as timer 51 is operative to measure the energizing interval of the motor windings; thyristor section 83, 84 remains deactivated throughout that period, owing to the continuous blocking of gates 73 and 74.

After the timer 51 has run its course, its output is applied by way of OR gate 38 to the resetting input of flip-flop 40 which thereupon starts the timer 52 and simultaneously trips the monostable multivibrator 60 to give rise to the pulse Q whereby thyristor 85 fires on the next positive half-cycle of the voltage on conductor 101. This operation permits the passage of a pulsating unidirectional braking current through phase winding 93 for a period determined by the duration of pulse Q. At the same time, gates 71 and 72 are closed in the absence of an enabling input to AND gate 33 so that windings 91 and 92 are deenergized. Thus, the squirrel-cage rotor of motor 90 is sharply decelerated and brought almost instantaneously to standstill.

At the end of the blocking interval measured by timer 52, by which time the pulse Q will have subsided, a setting pulse is applied by that timer to flip-flop 40 through OR gate 36 so that the flip-flop is again reversed to reoperate the timer 51 and to restart the sequence of operations previously described.

If, at any time thereafter, switch 31 is returned to its O position, a pulse in the output of inverter 37 resets the flip-flop 40, if necessary, and conditions the timer 52 for continuous operation with concurrent application of a cut-off voltage via a lead 39 to an input of timer 51 to disable the latter if it had been operating at that instant. Hence, the clock network 50 can be stopped (as well as restarted) at any time, regardless of the condition and adjustment of its circuits 40, 51, 52.

A displacement of switch 31 to position II will have the same effect as its shift into position I as far as the setting of flip-flop 40 is concerned; AND gate 34 then operates in lieu of AND gate 33 to open the gates 73 and 74 whereupon valve section 83, 84 is activated to the exclusion of valve section 81, 82 to energize the windings 91-93 in essentially the same manner as described above but with a reversal of the sense of rotation of the magnetic-field vector and, therefore, of the rotor of motor 90. Upon subsequent restoration of switch 31 to O, monostable multivibrator 60 is again tripped to energize the braking winding 93.

It will be apparent that the braking effect could also be realized if only part of winding 93 were traversed by pulsating current or if this current also passed through some portions of windings 91 and/or 92.

In FIG. 2 I have shown a modification of the system of FIG. 1 in which corresponding elements have been identified by the same reference numerals and need not be described again. Switch 31 of FIG. 1 has been replaced by an on-off switch 131 which, when closed, directly energizes the setting input of flip-flop 40 by way of OR gate 36 with omission of OR gate 35. Output lead 39 of timer 52 is connected to a common set/reset input of a further flip-flop 141 whose two outputs are tied to inputs of AND gate 33 and 34, respectively, in lieu of the switch contacts I and II of the preceding embodiment. Thus, whenever timer 52 becomes operative and energizes its lead 39, flip-flop 141 is either set or reset so that AND gates 33 and 34 are alternately prepared for conduction upon the subsequent return of flip-flop 40 to its set condition. As a result, motor 90 (FIG. 1) will rotate alternately clockwise and counterclockwise, with intervening pauses whose duration depends on the setting of timer 52 and may be adjusted independently of the length of its working period determine by the setting of timer 51.

It will thus be seen that I have provided an efficient system for utilizing the well-known advantages of induction-type motors (simplicity, large starting torque) and which intermittently operates such motors, with or without of reversal of rotation, in an automatic manner and without the use of any mechanical contacts. The independent adjustability of timing circuits 51, 52 and phase shifter 10 affords the widest choice of "on" and "off" periods as well as operating power or speed. Furthermore, the controlled rectifiers or thyristors 81–85 are triggered only during positive half-cycles so that misfirings are avoided. Naturally, the specific circuitry described and illustrated may be modified in various details without departing from the spirit and scope of my invention as defined in the appended claims.

I claim:
1. A circuit arrangement for intermittently driving a load, comprising:
   an induction motor coupled with said load and provided with winding means;
   a soruce of alternating current connected across said winding means for energizing same;
   electronic valve means in series with said winding means for selectively blocking the flow of alternating current therethrough from said source; and
   control means for said valve means including a bistable circuit with two alternate states of operation, input means for setting said bistable circuit in one of said states, a first timing cricuit responsive to said one of said states for measuring an energizing interval and for thereafter resetting said bistable circuit to the other of said states, and a second timing circuit responsive to said other of said states for measuring a blocking interval and thereafter returning said bistable circuit to said one of said states.

2. A circuit arrangement as defined in claim 1 wherein said valve means comprises a first section for energizing said winding means to operate said motor in one direction and a second section for energizing said winding means to operate said motor in the opposite direction, said control means including a selector for activating either of said sections.

3. A circuit arrangement as defined in claim 2 wherein said selector comprises a switch forming part of said input means.

4. A circuit arrangement as defined in claim 2 wherein said selector comprises a switchover circuit controlled by said bistable circuit for alternately activating said sections during successive energizing intervals.

5. A circuit arrangement as defined in claim 1, further comprising a brake circuit for said motor and switch means responsive to said control means for rendering said branke circuit effective at the beginning of said blocking interval.

6. A circuit arrangement as defined in claim 5 whereins said winding means comprises a first, a second and a third phase winding, said brake circuit including said third phase winding.

7. A circuit arrangement as delned in claim 6 wherein said source is a single-phase power supply, said valve means comprising a first set of controlled rectifiers for serially energizing said first and third windings directly from said source and reactance means for serially energizing said second and third windings in dephased relationship with reference to the serial energization of said first and third windings, said valve means further comprising a second set of controlled rectifiers for serially energizing said second and third windings directly from said source and for serially energizing said first and third windings in dephased relationship by way of said reactance means, said control means including a selector for activating either of said sets of controlled rectifiers to drive said motor in either of two directions.

8. A circuit arrangement as defined in claim 7 wherein said controlled rectifiers are provided with respective firing circuits under the control of said first timing circuit, said control means further including an adjustable phase-shifting network connecting said firing circuits to said source for varying the firing angle of said controlled rectifiers.

9. A circuit arrangement as defined in claim 5 wherein said switch means includes a monostable multivibrator connected to an output of said second timing circuit and a controlled rectifier triggerabled by said monostable multivibrator.

10. A circuit arrangement as defined in claim 1 wherein said first and second timing circuits are independently adjustable for varying the length of said energizing and blocking intervals.

References Cited

UNITED STATES PATENTS

| 3,105,927 | 10/1963 | Flatten et al. | 318—207 XR |
| 3,181,046 | 4/1965 | Sutton | 318—207 XR |
| 3,431,475 | 3/1969 | Wesner | 318—207 XR |

ORIS L. RADER, Primary Examiner

G. RUBINSON, Assistant Examiner

U.S. Cl. X.R.

318—207, 227, 272, 285